United States Patent
Miyake et al.

(10) Patent No.: US 7,817,552 B2
(45) Date of Patent: Oct. 19, 2010

(54) COMMUNICATION CONTROL METHOD AND SYSTEM

(75) Inventors: Motoharu Miyake, Yokosuka (JP); Hiroshi Inamura, Yokohama (JP); Osamu Takahashi, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 1160 days.

(21) Appl. No.: 10/914,910

(22) Filed: Aug. 10, 2004

(65) Prior Publication Data

US 2005/0063458 A1 Mar. 24, 2005

(30) Foreign Application Priority Data

Aug. 14, 2003 (JP) ............... 2003-207601

(51) Int. Cl.
*G01R 31/08* (2006.01)
(52) U.S. Cl. .................. 370/235; 370/231; 370/338; 709/235; 455/24; 455/69
(58) Field of Classification Search .......... 370/229, 370/230, 231, 237, 236, 494, 395.31; 455/24, 455/69, 70, 67.11; 709/235
See application file for complete search history.

(56) References Cited

U.S. PATENT DOCUMENTS

| | | | | |
|---|---|---|---|---|
| 6,741,555 B1 * | 5/2004 | Li et al. | .................. | 370/229 |
| 6,876,639 B1 * | 4/2005 | Cao | .................. | 370/331 |
| 7,392,279 B1 * | 6/2008 | Chandran et al. | ............ | 709/200 |
| 7,596,091 B2 * | 9/2009 | Sethi | .................. | 370/234 |
| 2001/0017844 A1 * | 8/2001 | Mangin | .................. | 370/231 |
| 2002/0156910 A1 * | 10/2002 | Senda | .................. | 709/232 |
| 2003/0107994 A1 * | 6/2003 | Jacobs et al. | ............ | 370/235 |
| 2003/0112754 A1 * | 6/2003 | Ramani et al. | ............ | 370/230 |
| 2006/0253622 A1 * | 11/2006 | Wiemann et al. | ............ | 710/52 |
| 2008/0123662 A1 * | 5/2008 | Basso et al. | ............ | 370/395.31 |

FOREIGN PATENT DOCUMENTS

JP         09-149077         6/1997

(Continued)

OTHER PUBLICATIONS

Jain et al, Congestion Control Using Multilevel Exsplicit Congestion Notificaton in Satellite Networks, 2001.*

(Continued)

*Primary Examiner*—Aung S Moe
*Assistant Examiner*—Vinncelas Louis
(74) *Attorney, Agent, or Firm*—Brinks Hofer Gilson & Lione

(57) ABSTRACT

A relay device 40, when it relays data blocks transmitted in succession from a transmitter device 20 to a receiver device 10, is caused to identify a state code showing a state of a communication resource used when the data blocks are transferred. Relay device 40 divides the identified state code into portions of a predetermined data size and writes the divided portions into a predetermined area of the data blocks. Receiver device 10 transmits to transmitter device 20 an acknowledgement containing the same data as is written in a predetermined area of the received data block. Transmitter device 20, upon receipt of the acknowledgement, reads the state code that is divided and written in the acknowledgement and increases or reduces the number of data blocks on the basis of the state code.

21 Claims, 6 Drawing Sheets

FOREIGN PATENT DOCUMENTS

WO        WO 01/97446 A2    12/2001

OTHER PUBLICATIONS

Ramakrishnan, K. et al., "The Addition of Explicit Congestion Notification (ECN) to IP", *Network Working Group*, Sep. 2001, 55 pages.

Ramakrishnan, K. et al., "A Proposal to Add Explicit Congestion Notification (ECN) to IP", Network Working Group, XP002124181, Jan. 1999, 21 Pages.

Ramani, R. et al., "Explicit Congestion Notification (ECN) in TCP over Wireless Network", Personal Wireless Communications, *2000 IEEE International Conference*, Dec. 17, 2000, pp. 495-499.

Chinese Office Action dated Mar. 24, 2006.

\* cited by examiner

| STATE CODE | STATE OF COMMUNICATION RESOURCE (DATA ERROR RATE $x$) |
|---|---|
| 01 | $x < 30\%$ |
| 10 | $30\% \leq x < 60\%$ |
| 11 | $x \geq 60\%$ |

| STATE CODE | MULTIPLICATION FACTOR OF CONGESTION WINDOW SIZE |
|---|---|
| 01 | 2 |
| 10 | 1 |
| 11 | 0.5 |

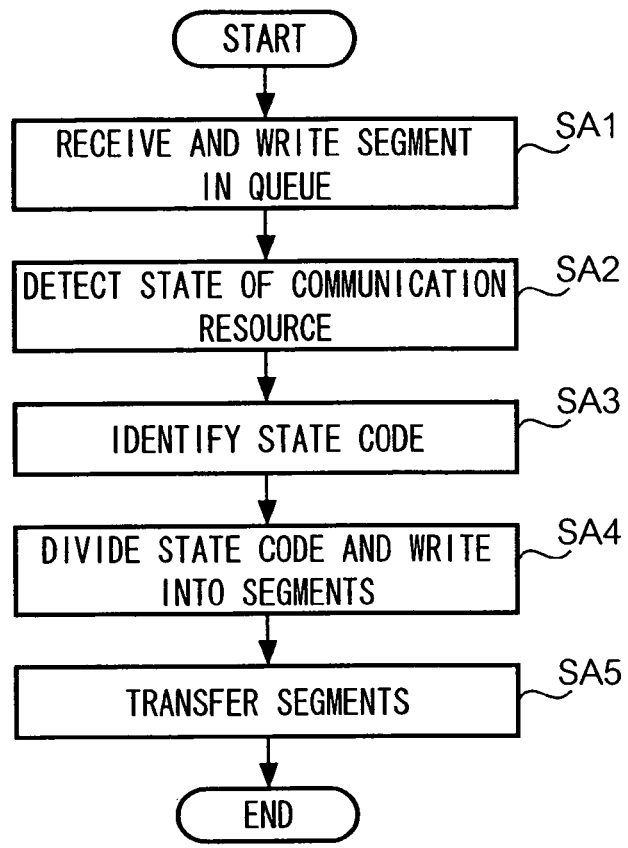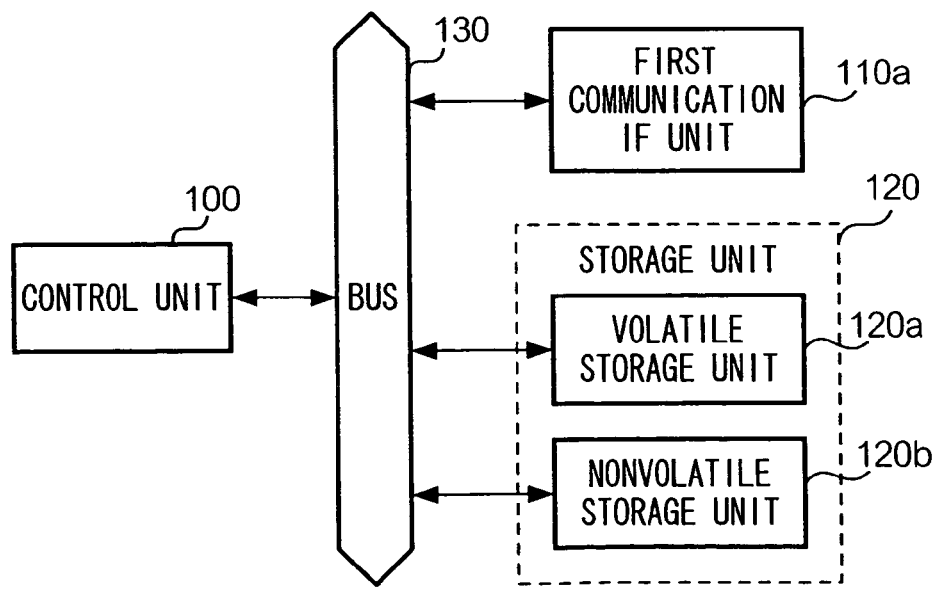

| STATE CODE | STATE OF COMMUNICATION RESOURCE (DATA ERROR RATE $x$) |
|---|---|
| 0011 | $x < 30\%$ |
| 1100 | $30\% \leq x < 60\%$ |
| 1111 | $x \geq 60\%$ |

| STATE CODE | MULTIPLICATION FACTOR OF CONGESTION WINDOW SIZE |
|---|---|
| 0011,011,00101 | 2 |
| 1100,100,11010 | 1 |
| 11 | 0.5 |

COMMUNICATION CONTROL METHOD AND SYSTEM

This application claims priority under 35 U.S.C. §119 to Japanese Patent Application No. 2003-207601 filed Aug. 14, 2003, the entire content of which is hereby incorporated by reference.

1. Technical Field

This invention relates to a technique used for data communication performed via a relay device.

2. Background Information

TCP (Transmission Control Protocol) is a communication protocol used under the OSI (Open Systems Interconnection) Reference Model, and is designed to ensure reliable data communication. Communication under TCP is conducted by dividing data for transmission into data blocks of a predetermined size (hereinafter, "segment"). Each segment has a header, and the header is assigned a unique sequence number which identifies the segment. Header sequence numbers are used to indicate segment transmission order between a transmitter and a receiver device. Consequently, segment loss can be detected at the receiver device on the basis of sequence numbers of segments received; and when segment loss is detected, the receiver device requests the transmitter device to retransmit the lost segment.

Communication under TCP further makes use of a network device, such as a router or the like between a transmitter and receiver device. At the router, or the like, data segments are buffered or queued. Several techniques have been devised for avoiding congestion in communication under TCP, one of which is referred to as ECN (Explicit Congestion Notification); specifications of this technique are disclosed in, K. Ramakrishnan, et al. "The Addition of Explicit Congestion Notification (ECN) to IP" RFC3168, September 2001. Description will now be given of data communication performed under TCP which supports ECN, with reference to FIG. 12.

As shown in FIG. 12, a segment transmitted from a transmitter device 220 is transmitted via a relay device 240 to a receiver device 210. Segments which are received from transmitter device 220 for transmission are queued in relay device 240 for sequential transmission to receiver device 210. Congestion occurs when a number of segments transmitted from transmitter device 220 exceed a number that the relay device is able to relay, i.e., a data volume of segments in a queue, exceeds the data capacity of the queue.

ECN addresses this problem by monitoring at relay device 240 an available capacity of a queue; and by notifying transmitter device 220 when an available capacity of the queue drops below a predetermined threshold. When a drop in the available capacity is detected, a value of a predetermined bit in a segment (hereinafter referred to as "CE (Congestion Experience) bit") received at relay device 240 is changed from a default value of "0" to "1". The relay device then transmits the segment with CE bit value "1" to receiver device 210. Upon receipt of the segment with CE bit value "1" at receiver device 210, a value of a further predetermined bit in the segment (hereinafter referred to as "ECN echo bit"), which is to be sent as an acknowledgment to transmitter device 220, is changed from "0" to "1". Upon receipt at transmitter device 220 of the acknowledgement segment with the ECN echo bit set to "1", a window size of a number of segments for successive transmission in the system is reduced, thereby avoiding congestion at relay device 240. A congestion window size in this technique can therefore be considered a number of segments that are successively transmitted before a transmitter device receives an acknowledgement having an ECN bit set to "1". Upon receipt at transmitter device 220 of an acknowledgment having an ECN bit set to "1", in a subsequent segment to be transmitted a value of a further predetermined bit (hereinafter referred to as "CWR (Congestion Window Reduce) bit") is changed from a default value of "0" to "1". Upon receipt at relay device 240 of the segment with the CWR bit set to "1", it is detected that a congestion window size has been reduced at transmitter device 220.

As stated, in the ECN method, when an available capacity of a queue area is scarce, a relay device notifies a transmitter of a segment that an available capacity of the queue area is scarce. However, the ECN technique suffers from a drawback in that a value of a CE bit used for notifying a transmitter device of an available capacity of a queue for enabling the transmitter device to change a current size of a congestion window can be set to only "0" or "1". Consequently, use of the CE bit in ECN is limited in that it is not possible to signify states of a variety of communication resources used by a relay device in a communication system, each of which communication resources utilizes the CE bit. To overcome this limitation there have been suggested modifications whereby a data area of a segment is reserved for notifying detailed states of different communication resources in a communication system. However, a problem arises in making such modifications in that downward compatibility in devices utilizing an existing communication protocol may not be available.

SUMMARY OF THE INVENTION

The present invention has been made to overcome the problem stated above, and its object is to provide a technique for improving transmission efficiency by enabling a transmitter device to increase or reduce a number of data blocks to be transmitted in succession on the basis of a state of one or more communication resources, for example a communication path, used by a relay device when relaying data blocks from a transmitter device to a receiver device, while maintaining an existing communication protocol compatibility. To obtain this object, the present invention provides a means of indicating to a transmitter device a current state of one or more communication resources, for example, a communication pathway, utilized by a relay device in relaying one or more data blocks transmitted from the transmitter device to a receiver device, to thereby avoid potential congestion.

Specifically, the present invention provides a communication control method comprising notifying by a relay device a transmitter device of a detected state of a communication resource used by the relay device when relaying via the relay device one or more data blocks transmitted from the transmitter device to a receiver device; and increasing or reducing at the transmitter device a number of data blocks transmitted in succession based on the notified state of the communication resource. Preferably, the notifying step includes generating state data showing the detected state of the communication resource; and transmitting the state data to the transmitter device by writing the state data into at least one of the one or more data blocks or one or more acknowledgement data blocks for acknowledging receipt of the one or more data blocks, so that the state data is received by the transmitter device.

The present invention further provides a relay device comprising: a relaying means for relaying one or more data blocks transmitted from a transmitter device to a receiver device; and a notifying means for notifying the transmitter device of a state of a communication resource used by the relay device when the one or more data blocks are relayed by the relaying means. Preferably, the relay device further comprises detection means for detecting a state of the communication resource; and generation means for generating state data showing the detected state.

In a preferred embodiment of the relay device, the state data is divided into portions and written into the one or more data blocks or into one or more acknowledgement data blocks, so as to write each of the divided portions of the state data sequentially into the one or more data blocks in an order designated by a sequence number contained in each of the one or more data blocks or acknowledgment data blocks.

The present invention still further provides a transmitter device comprising: transmission means for transmitting a certain number of data blocks in succession to a receiver device via a relay device; receiving means for receiving, from the relay device, state data showing a state of a communication resource used by the relay device when relaying the certain number of data blocks to the receiver device; and changing means for increasing or reducing the certain number of data blocks based on the state data received by the receiving means.

Preferably, the transmitter device is further provided with storage means for storing at least two instruction data for increasing or reducing the certain number of data blocks, the at least two instruction data being correlated with at least two state data, respectively, wherein the changing means identifies one instruction data, from among the at least two instruction data, that corresponds to the state data received from the relay device, and increases or reduces the number of data blocks according to the identified instruction data. In another preferred embodiment, the transmitter device is further provided with obtaining means for obtaining the state data from the more than one acknowledgement data blocks when the receiving means receives the state data that has been divided and written in more than one acknowledgement data blocks for acknowledging receipt by the receiver device of the certain number of data blocks.

Additionally, the present invention provides a program product for causing a computer device to execute the processes performed by the transmitter device or by the relay device elaborated above.

According to the present invention, efficient data transmission is enabled while avoiding congestion at a relay device. The present invention enables a transmitter device not only to reduce but to increase a number of data blocks transmitted in succession based on a state of a communication resource used by a relay device when transferring a data block transmitted from the transmitter device to a receiver device, while maintaining compatibility with an existing communication protocol.

BRIEF DESCRIPTION OF THE DRAWINGS

FIG. 5 is a flowchart showing a flow of a segment relaying operation executed by a control unit 100 of relay device 40.

FIG. 6 is a diagram showing an example of a configuration of transmitter device 20.

DETAILED DESCRIPTION OF PREFERRED EMBODIMENTS

In the following, an embodiment of the present invention will be described with reference to the attached drawings.

A. Configuration

1. Configuration of System

Figures 1, 2:
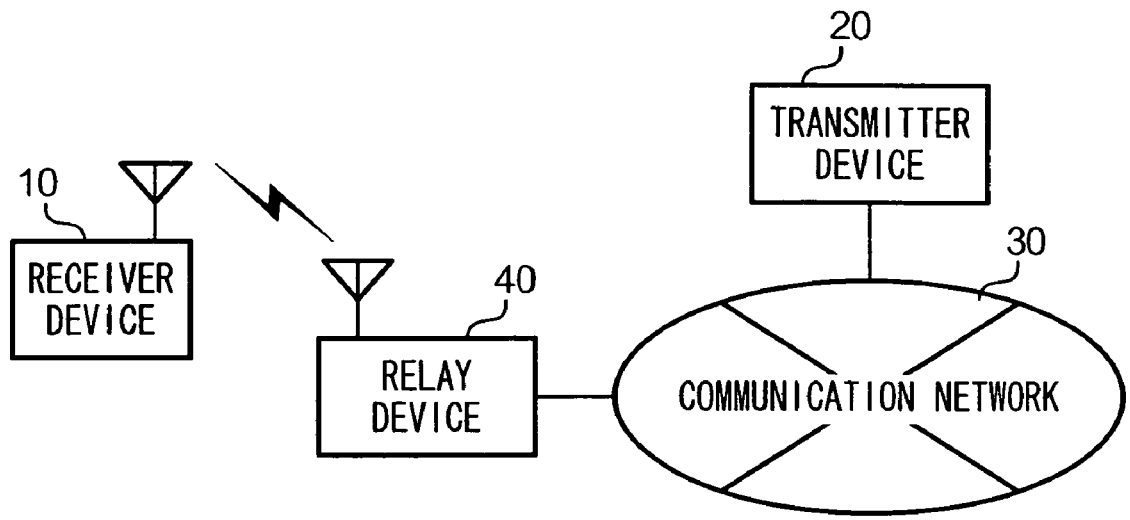
FIG. 1 is a diagram showing an overall configuration of a communication system according to an embodiment of the present invention.
FIG. 2 is a diagram showing an example of a state code table stored in a relay device 40.

In FIG. 1, a receiver device 10 is a computer device provided with a wireless communication function and capable of performing wireless communication, according to TCP, with a wireless access point device serving the device 10. A transmitter device 20 is a computer device connected to a communication network 30 such as the Internet, and capable of transferring data according to TCP.

A relay device 40 is a wireless access point device connected to communication network 30, and is capable of relaying communication between receiver device 10, which is located in a wireless area covered by relay device 40, and transmitter device 20. Specifically, relay device 40 establishes a wireless communication connection with receiver device 10 which relay device 40 serves, while it establishes a communication connection via communication network 30 with transmitter device 20. Relay device 40 then receives a segment transmitted via the communication connection from transmitter device 20, and transfers the received segment via the wireless communication connection to receiver device 10. Relay device 40 also receives an acknowledgement transmitted from receiver device 10 via the wireless communication connection, and transfers the received acknowledgement via the communication connection to transmitter device 20.

In the communication system shown in FIG. 1, receiver device 10, transmitter device 20, and relay device 40 are provided with basic functionalities for avoiding congestion according to the ECN technique described above. Further, receiver device 10, transmitter device 20, and relay device 40 are each provided with functionalities particular to the present invention.

Relay device 40 has a functionality of detecting and notifying to transmitter device 20, a state of a communication resource used for transferring a segment received from transmitter device 20 to receiver device 10, where the communication resource includes a queue, a wireless communication connection, and so on. More specifically, relay device 40 stores a state code table shown in FIG. 2. In the state code table, data showing a current state of the communication resource is associated with a state code or state data used for notifying the associated state of the communication resource to transmitter device 20.

In the state code table shown in FIG. 2, three types of state codes, "11", "01", and "10" are stored. Also in the table, a data error rate occurring in the wireless communication connection established with receiver device 10 is used as data for showing a state of the communication resource. The data error rate is a ratio of a number of lost segments or erroneously received segments divided by the total number of segments transmitted through the wireless communication connection to receiver device 10.

The state code table in FIG. 2 shows the following three situations: 1, when the data error rate is less than 30%, a state code "01" is notified to transmitter device 20; 2, when the data error rate is equal to or larger than 30% and less than 60%, a state code "10" is notified to transmitter device 20; and 3, when the data error rate is equal to or larger than 60%, a state code "11" is notified to transmitter device 20.

Relay device 40 detects the data error rate when transferring a segment received from transmitter device 20 to receiver device 10 and identifies a state code based on the detected data error rate and on details of the state code table. The identified state code is then divided by a unit of 1 bit, so that the divided state code is written in a predetermined area (CE bit area in the present embodiment) of the segment being transferred. In the present embodiment, the data error rate in the wireless communication connection is used as data showing a state of the communication resource, but it will be obvious to those skilled in the art that an available capacity of the queue area or a communication band assigned to the wireless communication connection may also be used.

Transmitter device 20, upon receiving the state code, increases or reduces a congestion window size, i.e., changes a number of segments to be transmitted in succession, on the basis of the state code. After the change is made to the congestion window size, transmitter device 20 notifies relay device 40 that the congestion window size has been changed using the CWR bit. Specifically, transmitter device 20 stores a control table shown in FIG. 3, in which in relay device 40 instruction data showing different values of state codes are associated with multiplication factors, i.e., values of a congestion window size to be changed.

Receiver device 10 has a functionality of writing, in the ECN echo bit an acknowledgement for transmission in response to a received segment, and a value set in the CE bit of the received segment. Thus, a state code, which is divided and written in segments and transferred from relay device 40, is notified to transmitter device 20 that originally transmitted the segments.

Thus, in the communication system shown in FIG. 1, a data error rate in the wireless communication connection is notified to transmitter device 20 while adhering to an existing TCP supporting ECN, such that a congestion window size is modified on the basis of a notified data error rate.

2. Configuration of Relay Device 40

Figures 3, 4:
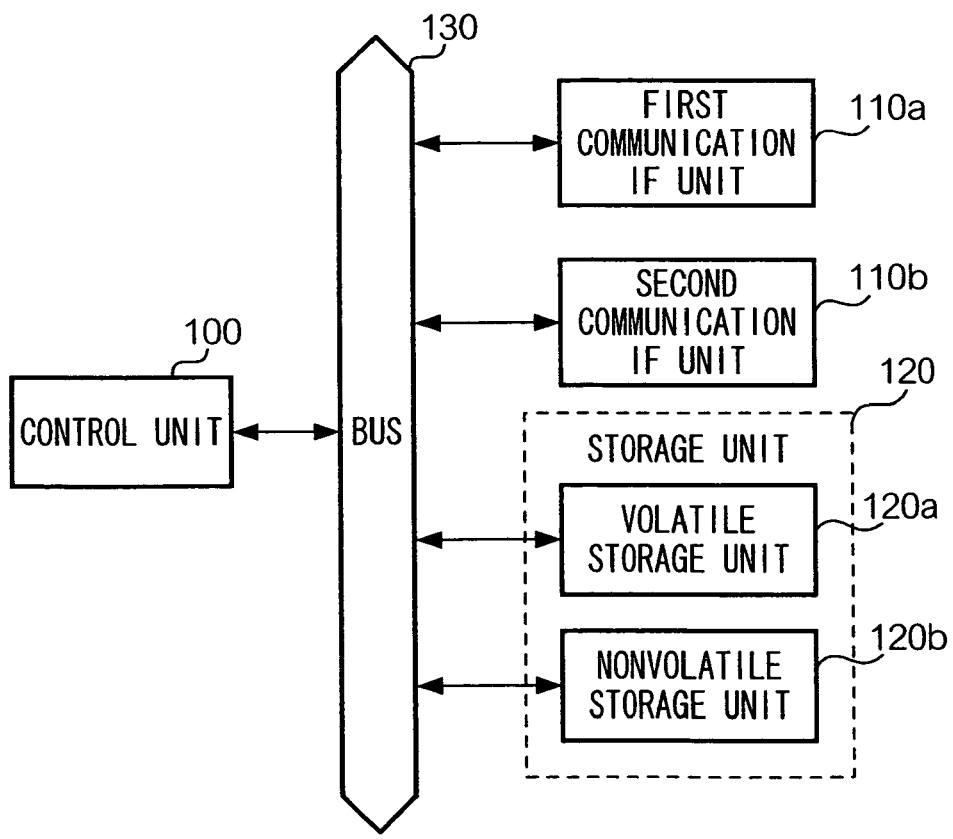
FIG. 3 is a diagram showing an example of a control table stored in a transmitter device 20.
FIG. 4 is a diagram showing an example of a configuration of relay device 40.

As shown in FIG. 4, relay device 40 has a control unit 100, a first communication interface (hereinafter referred to as "IF") unit 110a, a second communication IF unit 110b, a storage unit 120, and a bus 130 used for data exchange between the components.

Control unit 100 is, for example, a CPU (Central Processing Unit), which functions to execute and run software stored in storage unit 120, to thereby control each component of relay device 40. In operation, communication IF unit 110a connects to communication network 30, receives data transmitted via communication network 30, and passes the received data to control unit 100, and the data is then passed from control unit 100 to communication network 30. Communication IF unit 110b functions to wirelessly communicate with a receiver device 10 located in a wireless area which is covered by relay device 10. Communication IF unit 110b receives data transmitted from receiver device 10, passes the received data to control unit 100, and transmits data passed from control unit 100 to receiver device 10.

As shown in FIG. 4, storage unit 120 comprises a volatile storage unit 120a and a nonvolatile storage unit 120b. Volatile storage unit 120a is, for example, a RAM (Random Access Memory), and is used as a work area by control unit 100 when executing software. Volatile storage unit 120a also provides a queuing function. It should be noted here that it will be obvious to those who skilled in the art that nonvolatile storage unit 120b can be used for queuing instead of volatile storage unit 120a.

Nonvolatile storage unit 120b is, for example, a hard disk, and stores the state code table (refer to FIG. 2) and a variety of software. For example, in nonvolatile storage unit 120b, there is stored operating system (hereinafter referred to as "OS") software which control unit 100 executes, together with relay software which functions to enable segment relay from transmitter device 20 to receiver device 10. In the following, description will be given of functionalities realized by control unit 100 upon executing the OS software.

When relay device 40 is turned on, control unit 100 executes and runs the OS software from nonvolatile storage unit 120b. Control unit 100, while running the OS software, functions to control each component of relay device 40, and to read and execute other kinds of software stored in nonvolatile storage unit 120b. When the OS software is executed, control unit 100 executes and runs the relay software stored in nonvolatile storage unit 120b.

As shown in FIG. 5, control unit 100 is provided with 7 functionalities particular to the present invention, in addition to a relay function common to a relay device.

By a first functionality, first communication IF unit 110a establishes a communication connection with transmitter device 20; and second communication IF unit 110b establishes a wireless communication connection with receiver device 10.

By a second functionality, IF unit 110b receives a segment transmitted via the communication connection, and stores the received segment in its queue.

By a third functionality, a data error rate is detected in the wireless communication connection established by the second functionality.

By a fourth functionality, on the basis of a detected result of the third detection functionality, and on the basis of details of the state code table (refer to FIG. 2), a state code is identified for notification to transmitter device 20.

By a fifth functionality, the identified state code is divided into portions having a predetermined data size (1 bit in the present embodiment); and the divided state code is written in the CE bit area of a segment received as a result of the second functionality. More specifically, control unit 100 divides the state code by a unit of 1 bit, and writes the divided state code sequentially into the CE bit area of each segment for transmission such that a divided portion of the state code that is closer to its leading portion results in a segment having a smaller sequence number. It will be obvious to those skilled in the art that the state code may be divided by a unit other than a unit of 1 bit.

Control unit 100 is further provided with a function of transferring a segment in which the state code is written as a result of the fifth functionality, and which is relayed via the wireless communication connection to receiver device 10.

Control unit 100 is further provided with a function of stopping writing of the state code in the CE bit area in a case that a CWR bit is set to "1" in a received segment. It is also possible to stop the writing operation of the state code into the CE bit area when a predetermined time has elapsed after the segment with the state code is transmitted by the transfer functionality instead of receiving a CWR bit being set to "1".

As in the foregoing, a hardware configuration of relay device 40 is the same as that of a general computer, but functionalities particular to the relay device of the present invention are provided by control unit 100 upon execution of the unit of software stored in the storage unit.

3. Configuration of Transmitter Device 20

Next, description will be given of a configuration of transmitter device 20 with reference to FIG. 6. The configuration of transmitter device 20 is the same as that of relay device 40 except for the following four points. First, transmitter device 20 is not provided with second communication IF unit 110*b*. Second, transmitter device 20 stores data for transmission to receiver device 10 in nonvolatile storage unit 120*b*. Third, in nonvolatile storage unit 120*b*, rather than the state code table (refer to FIG. 2), the control code table (refer to FIG. 3) is stored.

Fourth, transmission software instead of the relay software is stored in nonvolatile storage unit 120*b*. Upon execution and running of the transmission software by control unit 100, data is transmitted to receiver device 10. In the following, description will be given of functionalities provided to control unit 100 by executing software stored in nonvolatile storage unit 120*b*.

When transmitter device 20 is turned on, control unit 100 executes and runs software from nonvolatile storage unit 120*b*. Control unit 100 operating under the OS software functions to control each component of transmitter device 20 and to read and execute other software from nonvolatile storage unit 120*b*. With the OS software executed in control unit 100, upon receiving a request from receiver device 10 for transmission of data stored in nonvolatile storage unit 120*b*, the OS reads and executes the transmission software from nonvolatile storage unit 120*b*. Control unit 100 while running the transmission software performs operations particular to a transmitter device according to the present invention, in addition to a data transmission operation performed according to TCP supporting ECN.

Figure 7:
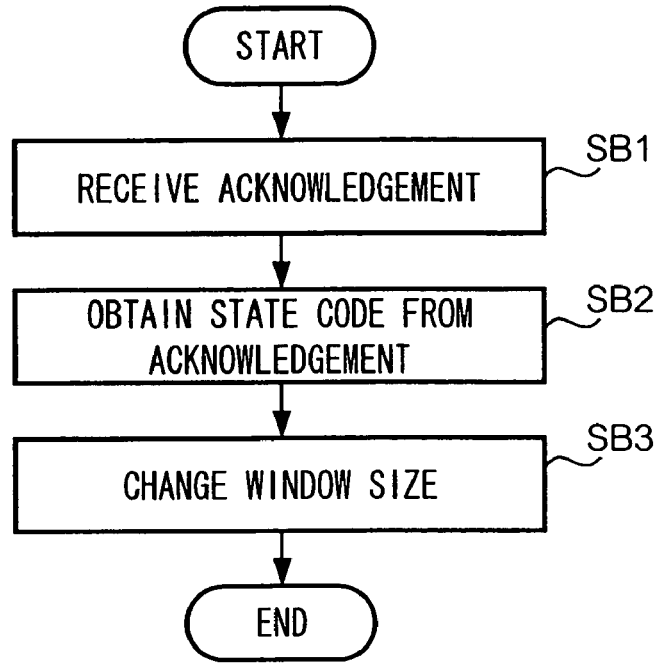
FIG. 7 is a flowchart showing a flow of a congestion window size changing operation executed by a control unit 100 of transmitter device 20.

FIG. 7 is a flowchart showing a congestion window size changing operation executed by control unit 100 operating according to the transmission software. As shown in FIG. 7, control unit 100 is provided with 3 functionalities particular to a transmitter device of the present invention by executing the transmission software.

By a first functionality, a state code is obtained where the state code is divided and written in an acknowledgement for transmission in response to a transmitted segment. Specifically, control unit 100 obtains the state code by concatenating 1-bit data written in a predetermined area of each of the received acknowledgements according to an ascending sequence number order contained in the acknowledgements.

By a second functionality, the congestion window size is updated based on the state code obtained by the first functionality and details of the control table (refer to FIG. 3).

Third, when the congestion window size is updated by the second functionality, "1" is set in the CWR bit of a subsequent segment to be transmitted. It should be noted that in a case that relay device 40 stops writing a state code when a predetermined time has elapsed after a segment is transmitted to receiver device 10, transmitter device 20 need not use the CWR bit to notify relay device 10 that the congestion window size has been changed.

As in the foregoing, a hardware configuration of transmitter device 20 is the same as that of a general computer, but functionalities particular to the transmitter device of the present invention are provided when control unit 100 executes and runs software stored in the storage unit.

4. Configuration of Receiver Device 10

Figure 8:
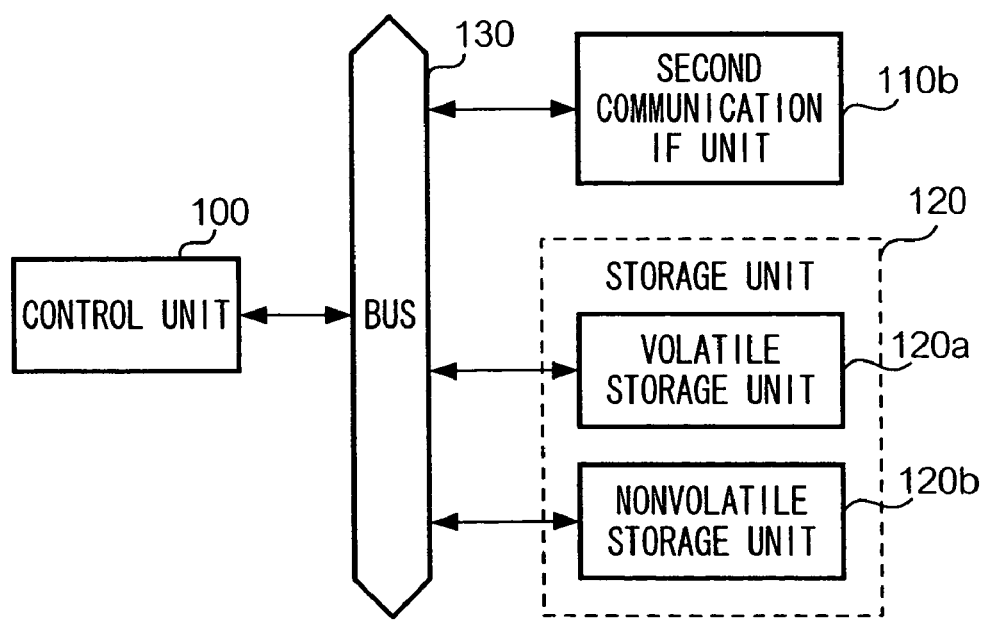
FIG. 8 is a diagram showing an example of a configuration of a receiver device 10.

Next, description will be given of a configuration of receiver device 10 with reference to FIG. 8. The configuration of receiver device 10 is the same as relay device 40 except for the following two points. First, receiver device 10 is not provided with first communication IF unit 110*a*. Second, OS software and receiving software is stored in nonvolatile storage unit 120*b*. In the following, functionalities provided to control unit 100 by executing and running software stored in nonvolatile storage unit 120*b* will be explained.

When receiver device 10 is turned on, control unit 100 executes the OS software from nonvolatile storage unit 120*b*. Control unit 100 running the OS software functions to control each component of receiver device 10, and to execute and run other software from nonvolatile storage unit 120*b*. When execution of the OS software is completed, control unit 100 which is running the OS, requests transmitter device 20 to transmit the data when an instruction is given, for example, by a user to obtain data stored in transmitter device 20, and, in the mean time, executes and runs the receiving software from nonvolatile storage unit 120*b*.

Figures 9, 10:
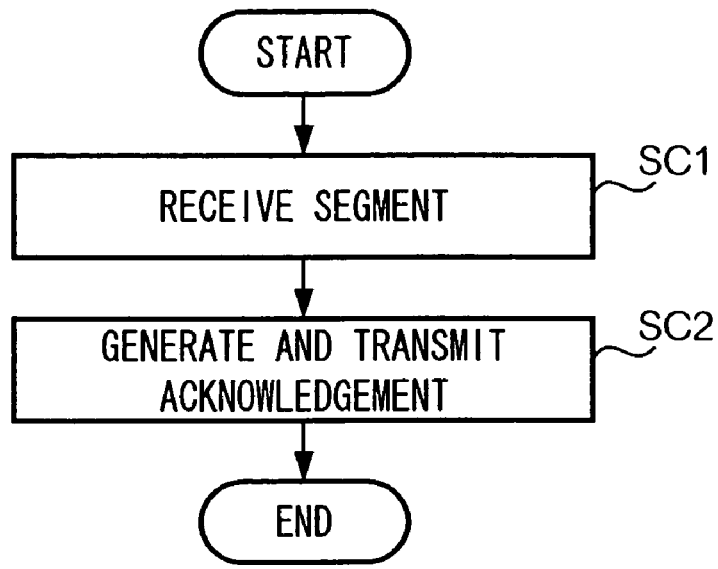
FIG. 9 is a flowchart showing a flow of a segment receiving operation executed by a control unit 100 of receiver device 10.
FIG. 10 is a diagram showing an example of a state code table according to a fourth modification.

FIG. 9 is a flowchart showing a flow of a segment receiving operation executed by control unit 100 when running the receiving software. As shown in FIG. 9, control unit 100 when running the receiving software is provided with functionalities particular to a receiver device of the present invention, in addition to a general receiving functionality. Specifically, control unit 100 is provided with a receiving functionality of receiving a segment transferred from relay device 40 and a functionality of generating an acknowledgement every time it receives a segment, and transmitting the generated acknowledgement to transmitter device 20.

Thus, a hardware configuration of receiver device 10 is the same as that of a general computer, but functionalities particular to the receiver device of the present invention are provided when control unit 100 executes and runs software stored in the storage unit.

B. Operation

Next, description will be given, with reference to the drawings, of an operation exemplifying the characteristics of data communication performed in the communication system according to the present embodiment. In the following, it is assumed at the start of the operation that a wireless communication connection has already been established between receiver device 10 and relay device 40; and that a communication connection has already been established between transmitter device 20 and relay device 40. In this example, a data error rate of communication performed via the wireless communication connection is 5% at the starting point of the operation. Also, transmitter device 20 has transmitted two segments to receiver device 10.

The two segments transmitted from transmitter device 20 reach relay device 40 via the communication connection. Upon receiving the two segments, control unit 100 of relay device 40 performs an operation as shown in FIG. 5.

As shown in FIG. 5, control unit 100 of relay device 40 receives segments transmitted from transmitter device 20 through first communication IF unit 110*a*, and then writes the received segments into the queue area (Step SA1).

Subsequently, control unit 100 detects a state of a communication resource used when transferring segments received in Step SA1 to receiver device 10 (Step SA2). In the present example of the operation, control unit 100 detects a data error rate in the wireless communication connection established with receiver device 10. Control unit 100 then identifies, on the basis of a detected result of Step SA2 and the state code table (refer to FIG. 2), a state code to be notified to transmitter device 20 (Step SA3). Given that the data error rate in the wireless communication connection is 5% in this example, control unit 100 identifies a state code, "01", to be notified to transmitter device 20.

Control unit 100 then divides the state code identified in Step SA3 by a unit of 1 bit and writes the divided state code into the CE bit area of the segments stored in the queue area (Step SA4). The segments are then transmitted through second communication IF unit 110b to receiver device 10 (Step SA5). For example, given that the two segments received from transmitter device 20 have sequence numbers of 500 and 1000, respectively, contained therein, control unit 100 writes "0" into the CE bit area of a segment having sequence number of 500, and "1" into the CE bit area of a segment having sequence number of 1000. The segments are then transmitted via second communication IF unit 110b to receiver device 10.

The two segments thus transmitted from relay device 40 reach receiver device 10 via the wireless communication connection. Upon receiving the segments, control unit 100 of receiver device 10 performs an operation as shown in FIG. 9.

Control unit 100 of receiver device 10, when it receives the segments transferred from relay device 40 via the wireless communication connection (Step SC1), generates an acknowledgement as a response to each of the received segments. Control unit 100 writes in the ECN echo bit area of the generated acknowledgement a value set to the CE bit area of the each received segment for transmission to transmitter device 20 (Step SC2). Specifically, control unit 100 generates, as a response to the segment having sequence number of 500 and the CE bit being set to "0", an acknowledgement containing sequence number 1000 and writes "0" in the ECN echo bit area of the acknowledgement. As a response to the segment having sequence number of 1000 and the CE bit being set to "1", control unit 100 generates an acknowledgement containing sequence number 1500 and writes "1" in the ECN echo bit area of the acknowledgement.

The acknowledgments thus transmitted from receiver device 10 reach relay device 40 via the wireless communication connection and are eventually transferred via the communication connection to transmitter device 20. Control unit 100 of transmitter device 20, upon receiving such acknowledgements performs an operation as shown in FIG. 7.

FIG. 7 is a flowchart showing a flow of a congestion window size changing operation performed by control unit 100 of transmitter device 20 upon receipt of the acknowledgements. As shown in FIG. 7, control unit 100, when it receives acknowledgements for all of the transmitted segments (Step SB1), obtains a state code divided and written into the received acknowledgements (Step SB2). Specifically, control unit 100 concatenates data written in the ECN echo bit area of each acknowledgement received in Step SB1, in an ascending order of sequence number contained in each of the received acknowledgements, thereby to obtain a state code notified from relay device 40.

Subsequently, control unit 100 changes the congestion window size based on the state code obtained in Step SB2 and details of the control table (refer to FIG. 3) (Step SB3). Given that in this example a value of the state code notified from relay device 40 is "01", control unit 100 doubles the value of the congestion window size.

Thus, a transmitter device according to the present embodiment is able to change the congestion window size on the basis of a state code transmitted from a relay device. The state code is identified based on a state of a communication resource used for transferring a segment transmitted from a transmitter device to a receiver device, and therefore, it becomes possible to change the congestion window size based on the state of a communication resource.

C. Modifications

In the foregoing, an embodiment of the present invention has been described, but the present invention is not limited to this embodiment and may be modified as, for example, in the following.

Modification 1:

In the above main embodiment, relay device 40 is a wireless access point device connected to communication network 30 and relays communication between a receiver device 10 located in a wireless area covered by the relay device and a transmitter device 20 connected to communication network 30. However, the relay device according to the present invention is not limited to such a wireless access point device, and may be any relay device that relays communication between a transmitter device and a receiver device, regardless of whether a connection between the relay device and the transmitter or receiver device is wired or wireless. For example, a relay device may be wirelessly connected to both a transmitter and a receiver device, where such a relay device receives segments wirelessly transmitted from the transmitter device and wirelessly transmits the received segments to the receiver device. Also, a relay device may be wired to a first communication network and a second communication network.

Modification 2:

In the above main embodiment, a transmitter device, a relay device, and a receiver device perform communication according to TCP. However, a different communication protocol but TCP may be used for performing the communication between the transmitter device and the relay device according to the present invention if a state of a communication resource detected by a relay device can be notified to a transmitter device using the protocol.

In the above embodiment, receiver device 10 is provided with a functionality of returning an acknowledgement containing data identical to that written in a predetermined area of a received segment. However, even when a receiver device is not provided with such functionality, a state of a communication resource detected by a relay device can still be notified to a transmitter device. Specifically, a relay device is first caused to transfer a segment received from a transmitter device to a receiver device without adding any information. When an acknowledgement responding to the above segment is received at the relay device, the relay device is caused to divide and write the state code in the acknowledgement. Thus, it becomes possible to notify a state of a communication resource detected by a relay device to a transmitter device.

Modification 3:

In the above main embodiment, the congestion window size is updated only on the basis of a state of a communication resource. However, in addition to a state of a communication resource, the congestion window size may be updated when predetermined, additional conditions stored in a relay device are fulfilled. For example, only a particular transmitter device may be caused to change the congestion window size. This is enabled by setting in the above predetermined conditions data uniquely identifying a transmitter device that is caused to change the congestion window size based on a state of a communication resource, such as a communication address assigned to the transmitter device or data showing a subnetwork to which the transmitter device belongs. In another example, data showing a particular time zone may be set in the above condition data, and the congestion window size may be caused to be updated only during a designated time.

Modification 4:

In the above main embodiment, receiver device 10 is caused to return an acknowledgement in response to each segment transferred from relay device 40. However, when a plurality of segments transferred from relay device 40 correspond to a plurality of portions of one large segment, which has been divided at relay device 40 before transfer, receiver device 10 may be caused to transmit only one acknowledgement for all of the divided portions (i.e., segments) of the large segment. A segment transferred from relay device 40 can be determined based on data written in an area called IP option field of the segment, whether the transferred segment is a portion of one large segment divided at relay device 40.

Modification 5:

In the above main embodiment, receiver device 10, each time it receives a segment, transmits an acknowledgement responding to the received segment. However, the present invention is not limited to such a receiver device, and may be a receiver device which transmits an acknowledgement according to general specifications of TCP, where it is provided that one acknowledgement is to be transmitted for at least every two full-size segments. In this case, a state code table shown in FIG. 10, instead of the state code table shown in FIG. 2, is stored in relay device 40; and a control table shown in FIG. 1, instead of the control table shown in FIG. 3, is stored in transmitter device 20.

The state code table shown in FIG. 10 differs from the table in FIG. 2 in that a state code having a data length of 4 bits is stored. The state code is configured by doubling the 2 bits of the state code used in the table shown in FIG. 2; that is, "1111", "1100", "0011" in the table of FIG. 10 correspond to "11", "10", and "01" in the table of FIG. 3, respectively. In other words, the state code is provided with redundancy so that at least bits "11", "10", or "01" can be restored by transmitted device 20.

Relay device 40 identifies, on the basis of a state of a communication resource, one of the three state codes, and then divides the identified state code by a unit of 1 bit, and writes the divided state code into four segments for transmission to a receiver device of the present modification. In the following, description will be given of a case where four segments each containing a 1-bit divided portion of the state code "0011" are transferred from relay device 40 to receiver device 10.

A receiver device of the present modification, when it receives the four segments, transmits an acknowledgement according to a general provision of TCP in one of the following three modes. In the first mode, an acknowledgement for each of the four segments is transmitted (i.e., four acknowledgements are transmitted). In the second mode, an acknowledgement for each of three out of the four segments is transmitted (i.e., three acknowledgements are transmitted). In the third mode, an acknowledgment for each of the first and the third of the four segments is transmitted; or an acknowledgement for the second and the third segment or the second and the fourth of the four segments is transmitted. In this case, a total of two acknowledgements are transmitted. The state code divided and written in the four acknowledgements transmitted in the first mode is "0011"; the state code divided and written in the three acknowledgements transmitted in the second mode is either "001" or "011"; and the state code divided and written in the two acknowledgements transmitted in the third mode is "01".

Figures 11, 12:
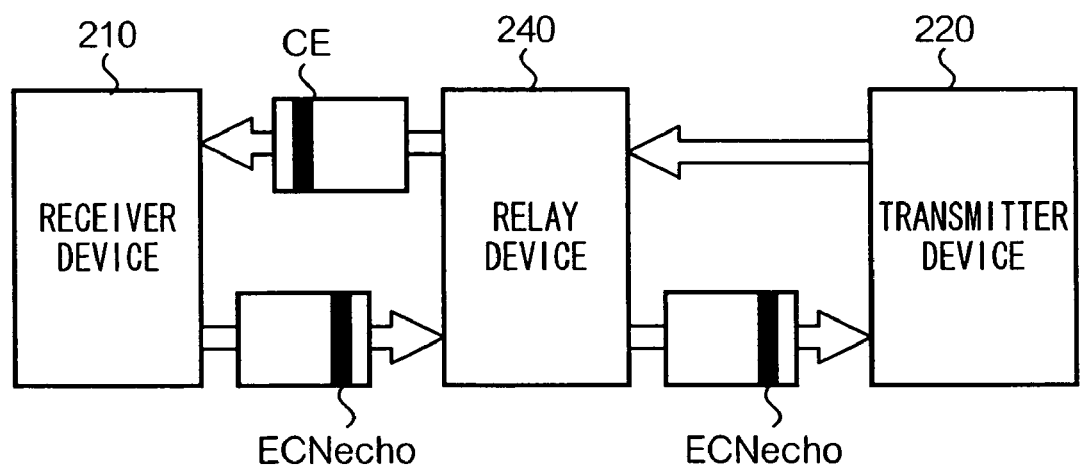
FIG. 11 is a diagram showing an example of a control table according to the fourth modification.
FIG. 12 is a diagram describing a conventional technique.

On the other hand, the control table shown in FIG. 11 stores the four types of state code, "0011", "001", "011", and "01" correlated with multiplication factor "2", which indicates that the congestion window size is to be doubled; while the data, "2", in the control code table of FIG. 3, is correlated to the state code "01". As described above, by storing the state code table of FIG. 10 in relay device 40 and storing the control table of FIG. 11 in transmitter device 20, it becomes possible to cause a receiver device receiving a segment relayed by relay device 40 to properly notify transmitter device 20 of a state of a communication resource, even when the receiver device transmits an acknowledgement according to a general provision of TCP.

Modification 6:

In the above main embodiment, the state code is data of a fixed length of 2 bits. However, in the present invention, the data length of the state code is not limited to 2 bits, and a state code having an appropriate data length may be assigned depending on a state of a communication resource to be notified from a relay device to a transmitter device. Also, the state code is not limited to data of a fixed data length but may be of variable length. In the case of using a state code having a variable length, it becomes possible, as in using the Huffman Code, to assign a state code having a short data length for a state of a communication resource that frequently occurs, and to assign a state code having a long data length for a state of a communication resource that rarely occurs.

Modification 7:

In the above main embodiment, a transmitter device is caused to obtain a state code transmitted from a relay device by concatenating data written in the ECN echo bit area of more than one acknowledgement in an ascending sequence number order contained in the acknowledgements. However, in a case where at least one of the acknowledgements transmitted from a receiver device does not reach a transmitter device, the transmitter device may be prohibited from changing the congestion window size. Thus, it becomes possible to prevent a transmitter device from mistakenly changing the congestion window size in a case of loss of an acknowledgement.

Modification 8:

In the above main embodiment, a state code to be notified to transmitter device 20 is identified based on a detected state of a communication resource, and on details of the state code table of FIG. 2. However, such a state code table need not be used to identify a state code to be notified to transmitter device 20. For example, control unit 100 of transmitter device 20 may be caused to execute the following process according to a differently coded program. That is, when the data error rate is less than 30%, "01" is set as a state code. In a case where the data error rate is equal to or larger than 30% and less than 60%, "10" is set as a state code; and when the data error rate is equal to or larger than 60%, "11" is set as a state code.

Modification 9:

In the above main embodiment, the transmission software is pre-stored in transmitter device 20; and the relay software is pre-stored in relay device 40. However, this software may be written in a computer-readable recording medium such as CD-ROM (Compact Disk-Read Only Memory), and such a recording medium may be used to install the above software in a general computer device. In this way, it becomes possible to impart the same functionalities to a general computer device, as those imparted to the transmitter device and the relay device of the present invention.

Modification 10:

In the main embodiment described above, a transmitter device obtains a state code that has been divided by a unit of 1 bit and written into a plurality of acknowledgment segments, by concatenation, in an order of a sequence number contained in each acknowledgement. It is also further possible for an acknowledgement to contain information which causes a transmitter device to recognize a start point of a state code. For example, in conventional ECN, the CE bit is set to "0" as a default value. Thus, in the present invention if at the relay device the CE bit is set to "1" a start of a state code can be notified. Specifically, when a relay device should notify a transmitter device of a state code "10", a start bit "1" is set in a predetermined area (CE bit in the main embodiment described above) of a header attached to a first segment; the first bit of the state code "1" is set in the second segment; and the second bit of the state code "0" is set in the third segment. A receiver device, when it generates an acknowledgement for each received segment, writes in a predetermined area of each acknowledgement the start bit and the state code that were written in the segments and transmits each acknowledgement to a transmitter device. Similarly, a stop bit "1" may be transmitted in addition to the start bit, with the stop bit designating an end of the state code.

In another preferred embodiment, a further predetermined area, (for example, an area for CWR bit) other than an area used for a state code, of the reserved area may be used for designating both a start and an end of a state code. In this case, when a relay device transmits a first bit of a state code by writing the bit into a segment, the relay device changes "0" bit in the CWR bit area to "1", and continues setting "1" in the CWR bit as long as the state code is also being transmitted. After the transmission of a state code is completed, the relay device changes the CWR bit from "1" to "0" when transmitting an immediately subsequent segment, thereby notifying a transmitter device of an end of the state code. The transmitter device confirms the end of the state code, and thereafter the received state code is interpreted by the transmitter device for performing a functionality particular to the present invention elaborated in the main embodiment described in detail above. Thus, it becomes possible to notify a transmitter device of a start and an end of a state code regardless of whether a state code in use is of a fixed or variable type.

It will be obvious to those skilled in the art that the above method of notifying a transmitter of a start and/or an end of a state code may be freely changed.

It is therefore intended that the foregoing detailed description be regarded as illustrative rather than limiting, and that it be understood that it is the following claims, including all equivalents, that are intended to define the spirit and scope of this invention.

The invention claimed is:

1. A communication control method comprising:
generating one state data indicative of a single detected state of a communication resource used by a relay device to relay to a receiver device a plurality of data blocks transmitted from a transmitter device, each one of the data blocks including a respective header and a respective sequence number;
dividing the one state data into a plurality of portions;
transmitting the one state data to the receiver device, wherein transmitting the one state data includes writing each of the portions of the one state data into a respective one of at least two of the data blocks; and
varying at the transmitter device a number of data blocks transmitted in succession based on the one state data.

2. The method of claim 1, wherein writing each of the portions of the one state data into the respective one of the at least two of the data blocks includes writing each of the portions of the one state data into the respective one of the at least two of the data blocks sequentially in an order designated by the sequence number contained in each respective one of the at least two of the data blocks.

3. The method of claim 1, further comprising transmitting, at the receiver, the one state data to the transmitter device by sequentially writing each of the portions of the one state data into a respective one of a plurality of acknowledgement data blocks to acknowledge receipt by the receiver device of one or more of the data blocks transmitted from the transmitter device, each one of the acknowledgement data blocks including a respective acknowledgment header and a respective acknowledgement data block sequence number.

4. The method of claim 1, further comprising transmitting, at the relay device, the one state data to the transmitter device by writing the one state data into one acknowledgement data block to acknowledge receipt by the receiver device of one or more of the data blocks transmitted from the transmitter device.

5. The method of claim 1, wherein writing each of the portions of the one state data into the respective one of the at least two of the data blocks includes writing each of the portions of the one state data into a Congestion Experience bit area of each respective one of the at least two of the data blocks, and wherein the Congestion Experience bit area is used with Explicit Congestion Notification.

6. The method of claim 1, wherein each of the portions of the one state data is one bit in length.

7. The method of claim 1, wherein transmitting the one state data to the receiver device is performed in response to fulfilment of at least one predetermined condition, wherein condition data indicative of the at least one predetermined condition is stored in the relay device.

8. The method of claim 7, wherein one of the at least one predetermined condition requires an identification of the transmitter device in the condition data to satisfy the at least one predetermined condition.

9. The method of claim 8, wherein the identification of the transmitter includes identification of a subnet, and the transmitter device belongs to the subnet.

10. A relay device comprising:
a memory; and
a processor in communication with the memory, the memory including computer code executable with the processor to:
relay to a receiver device a plurality of data blocks transmitted from a transmitter device, each one of the data blocks including a respective header and a respective sequence number;
generate one state data indicative of a single state of a communication resource used by the relay device to relay the data blocks;
divide the one state data into a plurality of portions;
write each of the portions of the one state data into a respective one of a plurality of acknowledgement data blocks, each one of the acknowledgement data blocks including a respective acknowledgement data block header and a respective acknowledgement data block sequence number; and
transmit the acknowledgment data blocks to the transmitter device, wherein transmission of the acknowledgement data blocks is to acknowledge receipt by the receiver device of one or more of the data blocks.

11. The relay device of claim 10, wherein the computer code is further executable to write each of the portions of the one state data sequentially into a respective one of the acknowledgement data blocks in an order designated by the respective acknowledgement data block sequence number contained in each respective one of the acknowledgement data blocks.

12. The relay device of claim 10, wherein the computer code is further executable to detect the single state of the communication resource.

13. The relay device of claim 10, wherein the computer code is further executable to generate the one state data with redundancy, and wherein the redundancy is added to restore the one state data at the transmitter device.

14. The relay device of claim 10, wherein the computer code is further executable to write each of the portions of the one state data into each respective one of at least two of the data blocks.

15. The relay device of claim 14, wherein the computer code is further executable to write each of the portions of the one state data into each respective one of the at least two of the data blocks in an order designated by a sequence number contained in each respective one of the at least two of the data blocks.

16. A transmitter device comprising:
a memory; and
a processor in communication with the memory, the memory including computer code executable with the processor to:
transmit a plurality of data blocks to a receiver device via a relay device, each one of the data blocks transmitted separately from the other data blocks, wherein a total number of the data blocks transmitted is a determined number;
receive, from the relay device, a plurality of bits indicative of a single state of a communication resource used by the relay device to relay the data blocks to the receiver device, wherein the bits are divided and written in a plurality of acknowledgement data blocks, the acknowledgement data blocks indicate acknowledgment of receipt by the receiver device of at least one of the data blocks and each one of the acknowledgement data blocks includes a respective header and a respective sequence number; and
vary the determined number based on the single state of the communication resource.

17. The transmitter device of claim 16, wherein the memory includes at least two instruction data, the at least two instruction data include a first instruction datum and a second instruction datum, the first instruction datum indicates the determined number is to increase, the second instruction datum indicates the determined number is to decrease, and each of the at least two instruction data corresponds to a respective one of at least two possible state data; and
wherein the computer code is further executable to:
identify one of the at least two instruction data from the bits; and
vary the determined number in accordance with the one of the at least two instruction data.

18. The transmitter device of claim 16, wherein the computer code is further executable to prohibit variation of the determined number in response to a failure of the transmitter device to receive one or more of the acknowledgement data blocks.

19. The transmitter device of claim 16, wherein the computer code is further executable to obtain the bits from the acknowledgement data blocks in accordance with the respective sequence number of each one of the acknowledgement data blocks.

20. A non-transitory computer-readable medium embodying executable program code, the executable program code comprising program code executable with a processor to:
relay a plurality of data blocks transmitted from a transmitter device to a receiver device, each one of the data blocks including a header and a sequence number and each one of the data blocks transmitted from the transmitter device separately from the other data blocks;
generate one state code indicative of a single state of a communication resource used to relay the data blocks;
divide the one state code into a plurality of portions; and
write each of the portions of the one state code into each respective one of at least two of the data blocks.

21. A non-transitory computer readable medium embodying executable program code, the executable program code comprising program code executable with a processor to:
transmit a plurality of data blocks to a receiver device via a relay device, each one of the data blocks including a respective header and each one of the data blocks transmitted separately from the other data blocks, wherein a total number of the data blocks transmitted is a determined number;
receive, from the relay device, a set of bits indicative of one state of a communication resource used by the relay device to relay the data blocks to the receiver device, wherein the set of bits has been divided and written in a plurality of acknowledgement data blocks, each one of the acknowledgement data blocks is independently received from the other acknowledgement data blocks, each one of the acknowledgement data blocks includes a respective acknowledgement data block header, and the acknowledgement data blocks indicate acknowledgment of receipt by the receiver device of at least one of the data blocks; and
vary the determined number based on the set of bits received by the receiver device.

* * * * *